(12) United States Patent
Sedlack

(10) Patent No.: US 7,062,551 B2
(45) Date of Patent: Jun. 13, 2006

(54) METHOD AND APPARATUS TO SOLVE COMPATIBILITY BETWEEN HETEROGENEOUS WEB SERVER ACCESS LOGS FORMATS

(75) Inventor: Debra Sue Sedlack, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/864,117

(22) Filed: May 24, 2001

(65) Prior Publication Data

US 2002/0178253 A1 Nov. 28, 2002

(51) Int. Cl.
*G06F 15/16* (2006.01)

(52) U.S. Cl. .................... 709/224; 709/217; 709/218; 709/219; 709/223; 709/224

(58) Field of Classification Search ............... 709/224, 709/217, 218, 219, 223
See application file for complete search history.

(56) References Cited

U.S. PATENT DOCUMENTS

| | | | | |
|---|---|---|---|---|
| 5,566,332 A | * | 10/1996 | Adair et al. | 707/101 |
| 5,611,044 A | * | 3/1997 | Lundeby | 714/38 |
| 5,764,978 A | * | 6/1998 | Masumoto | 707/100 |
| 5,831,950 A | * | 11/1998 | Furukawa | 369/53.31 |
| 5,845,283 A | * | 12/1998 | Williams et al. | 707/101 |
| 5,848,415 A | * | 12/1998 | Guck | 707/10 |
| 6,046,741 A | * | 4/2000 | Hochmuth | 715/704 |
| 6,128,628 A | | 10/2000 | Waclawski et al. | 707/203 |
| 6,131,079 A | * | 10/2000 | Smith | 703/13 |
| 6,741,990 B1 | * | 5/2004 | Nair et al. | 707/9 |
| 6,785,666 B1 | * | 8/2004 | Nareddy et al. | 707/1 |

* cited by examiner

*Primary Examiner*—Ario Etienne
*Assistant Examiner*—Emmanuel Coffy
(74) *Attorney, Agent, or Firm*—Duke W. Yee; Jeffrey S. LaBaw; Wayne P. Bailey

(57) ABSTRACT

A method, program and system for establishing compatibility between heterogeneous web server access log formats are provided. The invention comprises supplying a description of an access log file of a web server and opening a customizable configuration file. If the access log is static, the user sets the tog pattern definition to describe the data elements, order, and syntax of the log entries. If the access log is dynamic, the user sets a dictionary feature for a log pattern definition. The dictionary feature provides the ability to dynamically adapt to changes in the access log file's data order, syntax and number of data elements. A computer process invokes a web server access log translation engine (WSALTE) which converts the described web server access log file to Common Log Format (CLF) and returns the translated file back to the computer process.

18 Claims, 9 Drawing Sheets

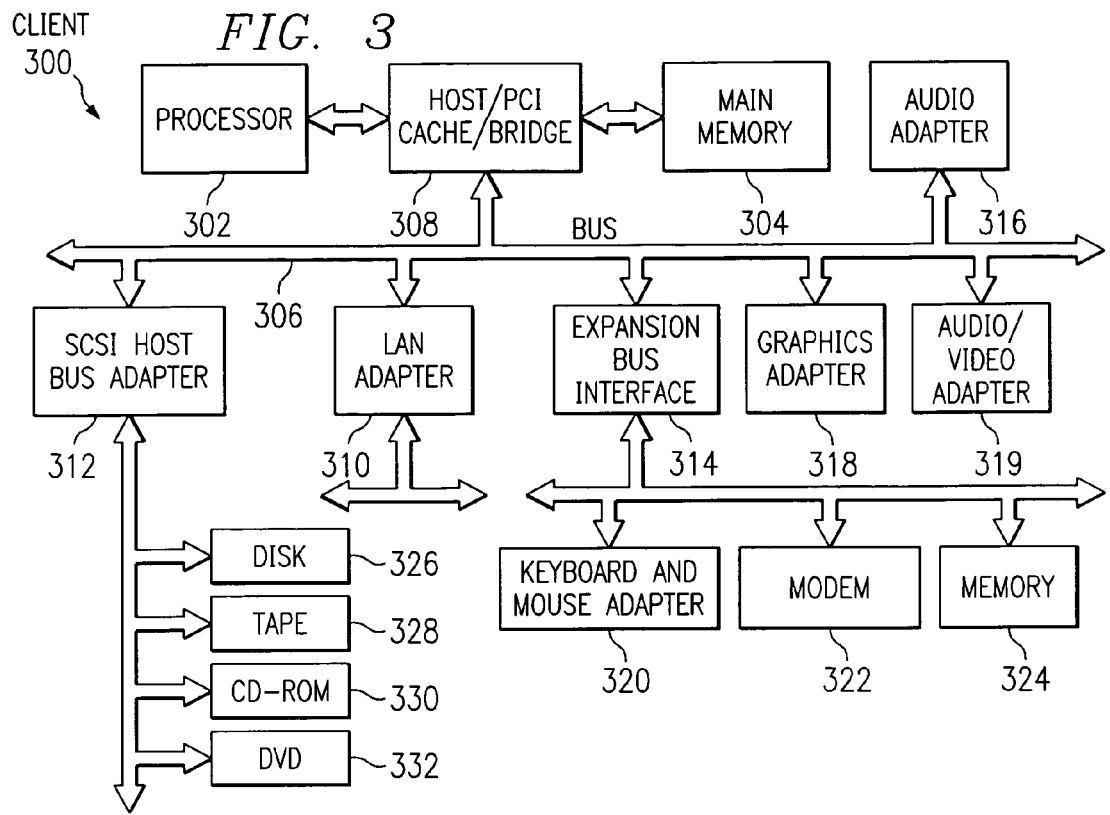
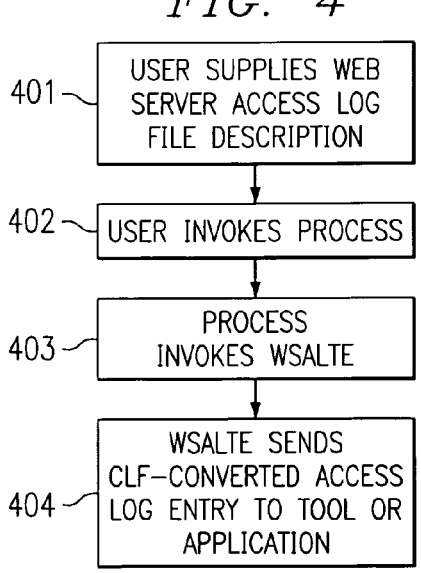
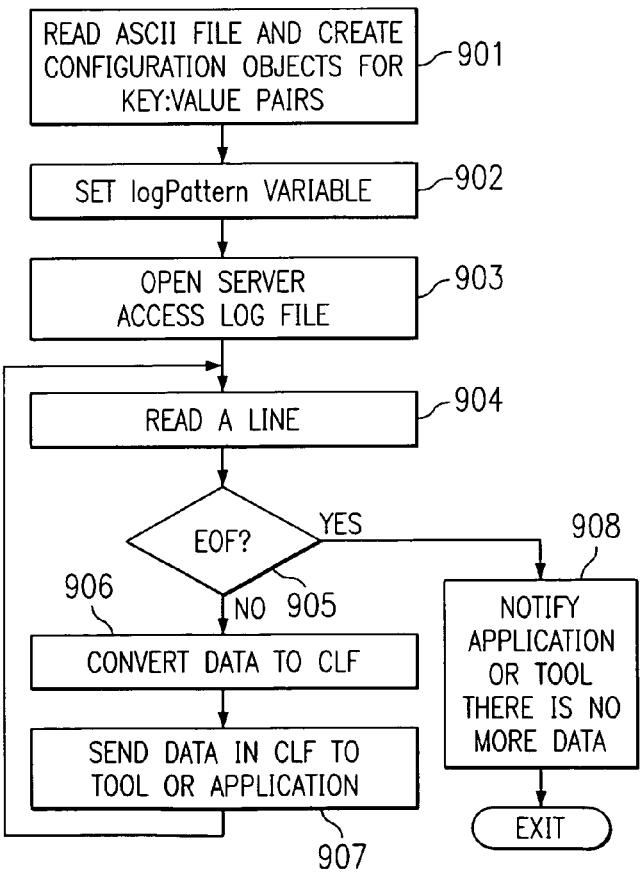

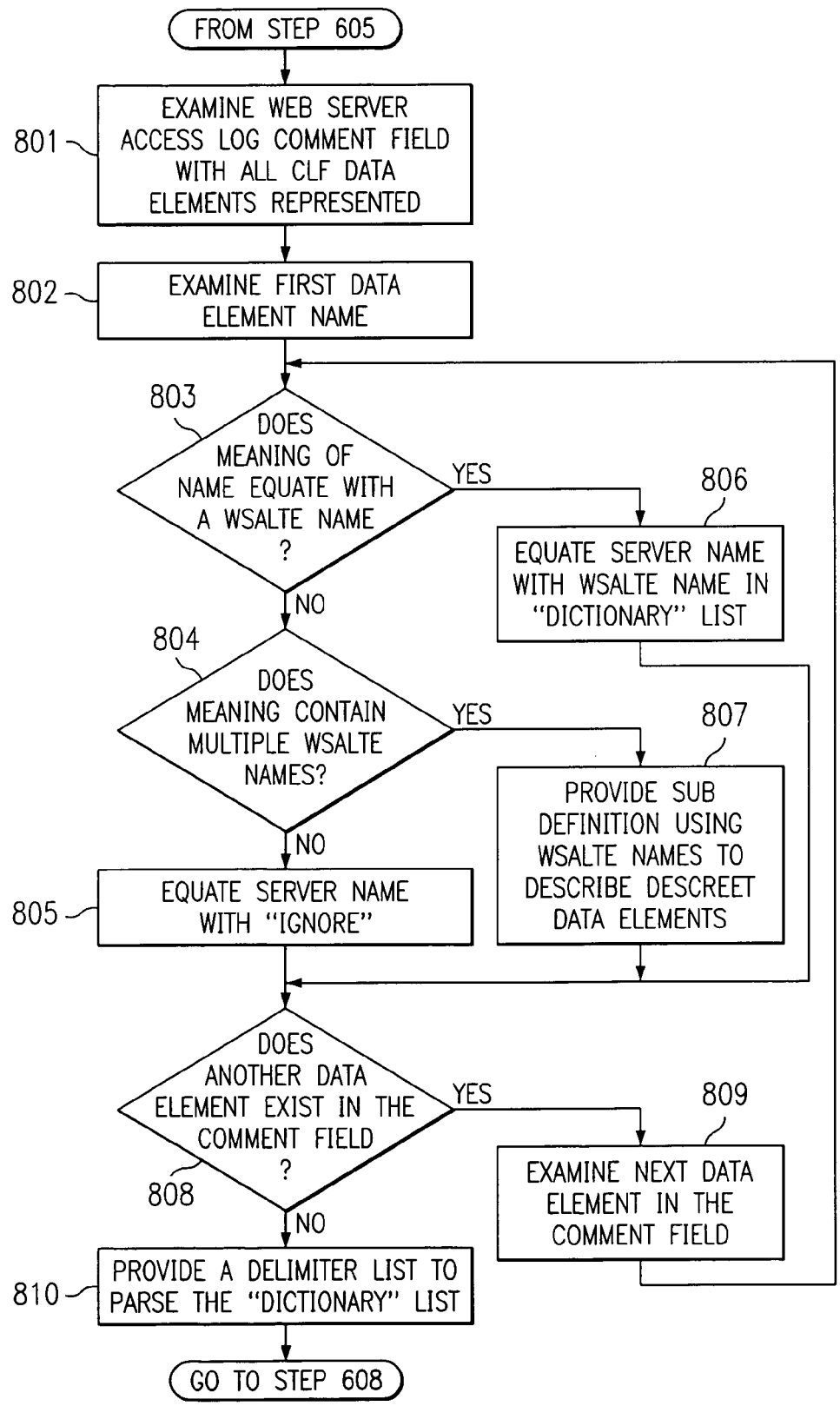

METHOD AND APPARATUS TO SOLVE COMPATIBILITY BETWEEN HETEROGENEOUS WEB SERVER ACCESS LOGS FORMATS

BACKGROUND OF THE INVENTION

1. Technical Field

The present invention relates to computer network environments, and more specifically to compatibility between heterogeneous systems.

2. Description of Related Art

Web servers maintain logs which record incoming requests and attempts to gain access to the servers. These access logs can be saved in various formats. For example, Microsoft's Information Server (IIS) provides four different formats in which the access log may be saved (IIS, NCSA, W3C, or ODBC). However, saving access logs in different formats presents a problem when servers must communicate with machines which do not use the same format(s). Organizations with heterogeneous sets of web servers which do not support the industry standard Common Log Format (CLF) cannot exchange data with other products. Some existing products require input data to be in CLF.

Web servers which do not support CLF cannot be added as support web servers for system that use different formats. Currently, there is no generic method for converting different server access log formats into CLF without the need for specific code for each type of log file format.

Therefore it would be desirable to have a generic method for converting a minimum set of required data (host, date, URL and status) into CLF without special code for each type of log file format.

SUMMARY OF THE INVENTION

The present invention provides a method, program and system for establishing compatibility between heterogeneous web server access log formats. The invention comprises supplying a description of an access log file of a web server and opening a customizable configuration file. If the access log is static, the user sets the log pattern definition to describe the data elements, order, and syntax of the log entries. If the access log is dynamic, the user sets a dictionary feature for a log pattern definition. The dictionary feature provides the ability to dynamically adapt to changes in the access log file's data order, syntax and number of data elements. The user then saves and exits the configuration file and invokes a computer process. This computer process may include, for example, a tool, application or adapter. The computer process in turn invokes a web server access log translation engine (WSALTE) which converts the described web server access log file to Common Log Format (CLF) and returns the translated file back to the computer process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a block diagram illustrating a data processing system in which the present invention may be implemented;

FIG. 4 depicts a flowchart illustrating an overview of user access and the web server access log translation of non-Common Log Format (CLF) log entries in accordance with the present invention;

FIG. 8 depicts a flowchart illustrating the process of setting the dictionary feature for dynamic access log files in accordance with the present invention;

FIG. 9 depicts a flowchart illustrating the operation of the Web Server Access Log Translation Engine (WSALTE) in accordance with the present invention;

DETAILED DESCRIPTION OF THE PREFERRED EMBODIMENT

Figure 1:
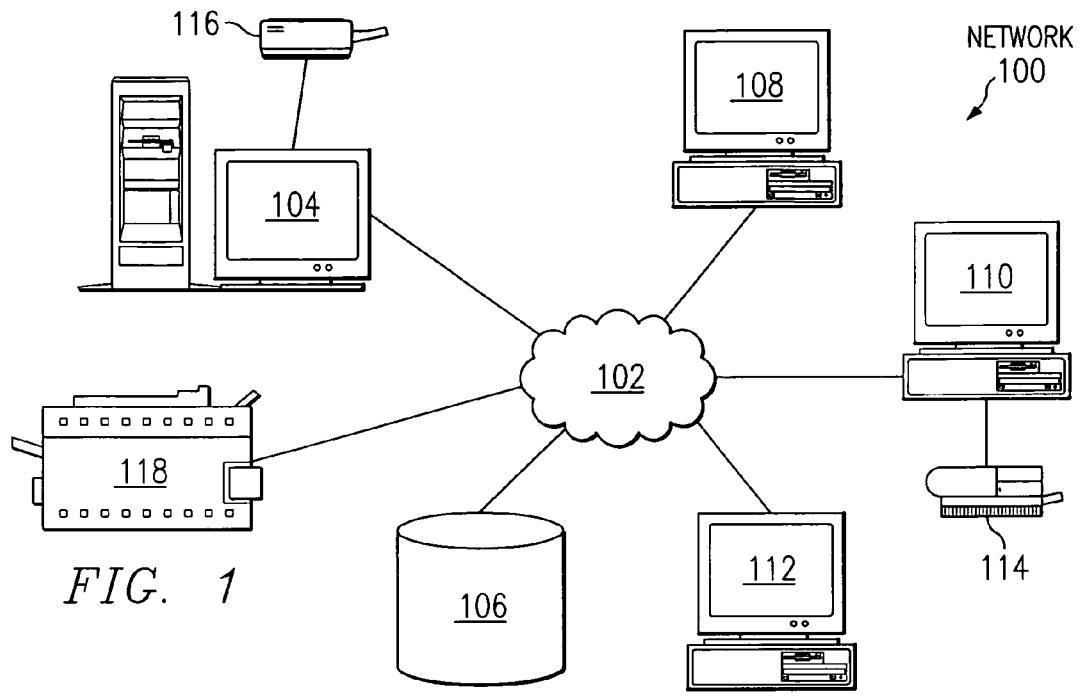
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
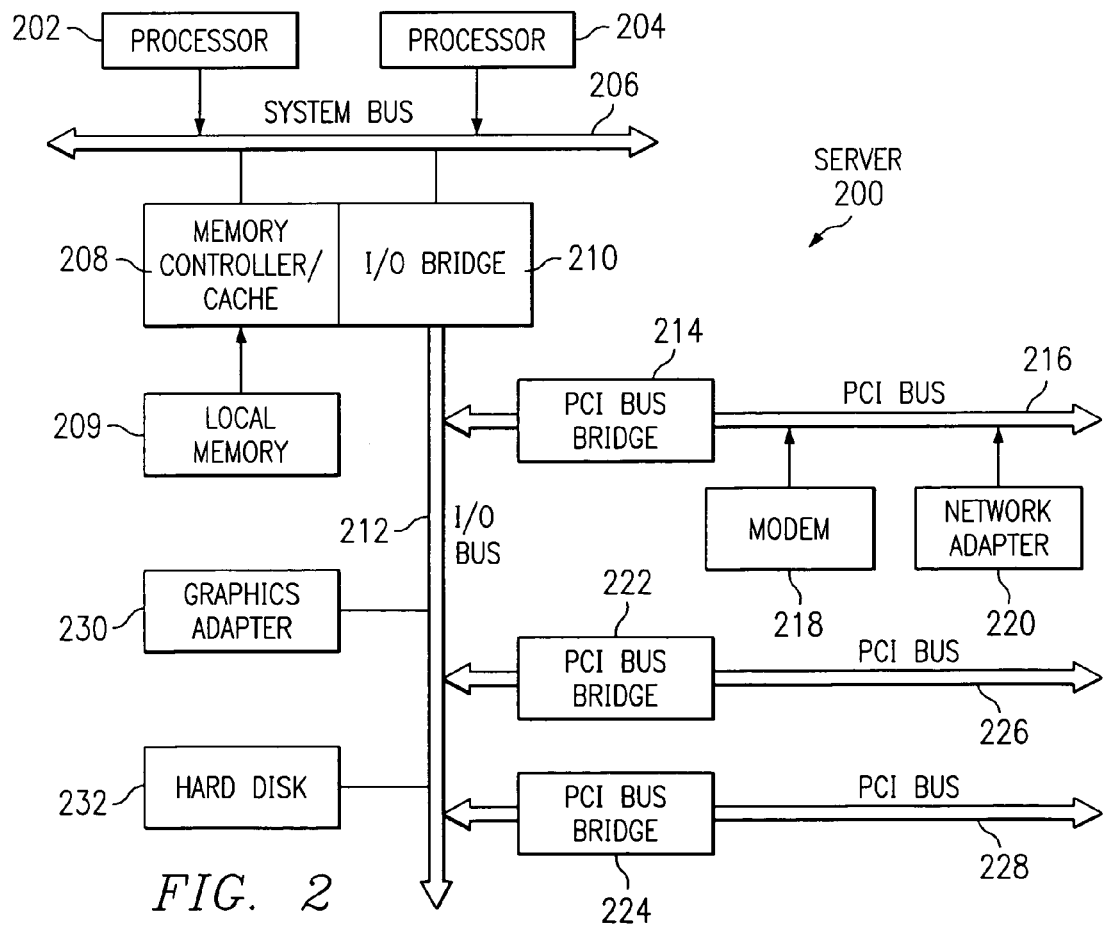
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The Web Server Access Log Translation Engine (WSALTE) is the method and apparatus to solve compatibility between heterogeneous web server access log formats. The WSALTE transforms any web server access log entry's data into the industry standard Common Log Format (CLF). In order for this solution to accurately transform any web server's access log format, the translation engine uses a customizable American Standard Code for Information Interchange (ASCII) configuration file which identifies the access log's data elements and describes the access log's syntax. It should be pointed out that the form of the access log file may be ASCII or binary, like a database file. For example, applications such as Web Intrusion Detection (webids) support Open DataBase Connectivity (ODBC) files that are exported, which means that the exported file is ASCII. However, the WSALTE could invoke database queries to retrieve the same information.

The WSALTE is based on three main features. First, the ability to isolate data to ensure that when a log entry line is parsed, certain data elements are parsed using a different set of parsing rules to preserve the data integrity. The ability to isolate data is not limited to a single level; WSALTE supports multiple levels of data isolation. Second, a "dictionary" feature provides the ability to dynamically adapt to changes in the access log file's data order, syntax and number of data elements. Third, the WSALTE has the ability to expand a single key word into multiple key words.

Referring to FIG. 4, a flowchart illustrating an overview of user access and web server access log translation of non-CLF log entries is depicted in accordance with the present invention. The user supplies a web server access log file description (step 401), which invokes the process requiring a CLF formatted access log entry (i.e. tool, application, adapter, etc.)(step 402). The process invoked by the user then invokes the WSALTE (step 403). The WSALTE then sends the requested CLF-converted access log entry to the tool, application or adapter requiring the entry (step 404).

Figure 5:
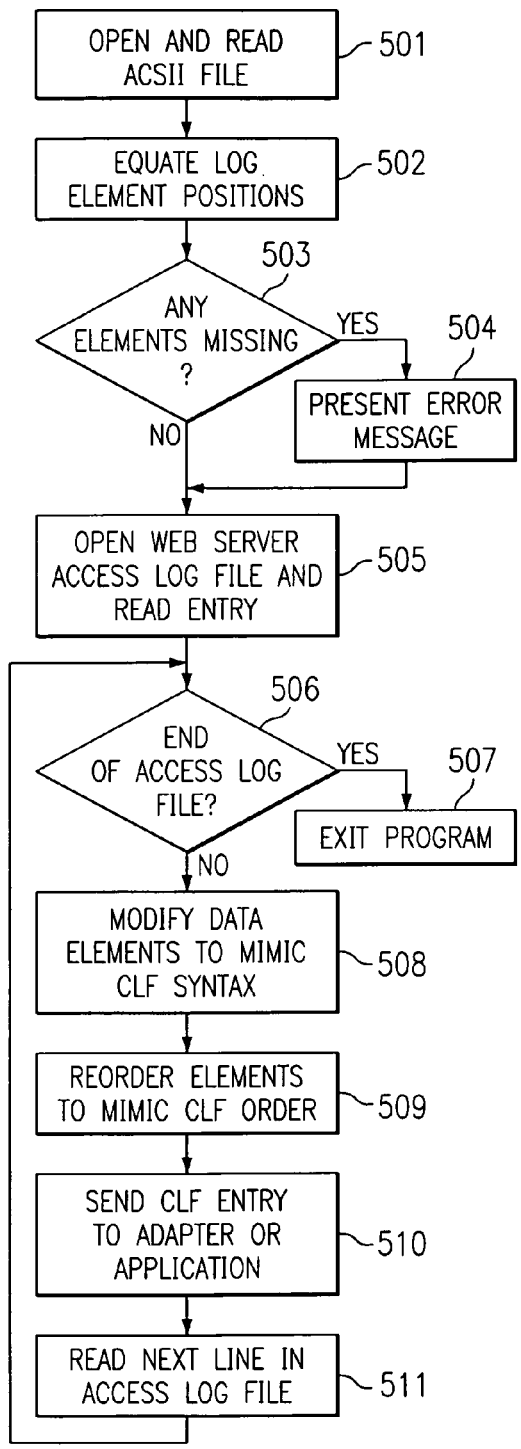
FIG. 5 depicts a flowchart illustrating an overview of the process of translating access log entries into CLF entries in accordance with the present invention.

Referring now to FIG. 5, a flowchart illustrating an overview of the process of translating access log entries into CLF entries is depicted in accordance with the present invention. By translating any type of web server access log entry into a CLF entry, the WSALTE broadens the type of web servers supported for products only designed to support access log files in CLF. The WSALTE begins the translation process by opening and reading a customizable ACSII file (step 501). The WSALTE then requests web server access log element position with corresponding CLF element position (step 502). For example, if the web server put the IP address of its host as the 7th element in the log entry, that IP address would be positioned as the first element in a CLF log entry.

The WSALTE must then determine if any required CLF data elements are missing (step 503). If there are missing elements, an error message is presented listing the missing data elements (step 504), and then the system moves on to opening the web server access log file and reading the entry (step 505). If there are no missing CLF data elements, the WSALTE moves directly to step (505).

The WSALTE determines if it has reached the end of the web server access log file (step 506). If it has reached the end of the file, the WSALTE exits the program (step 507). If it has not reached the end of the file, it continues and modifies any data elements (e.g. date or time) necessary to mimic CLF syntax (step 508). Elements are then reordered to mimic CLF order (step 509).

The synthesized CLF entry is then sent to an adapter or application (step 510). The WSALTE moves on to the next line in the web server access log file (step 511) and returns to Step 506. This process continues until the WSALTE reaches the end of the log file and exits the program at step 507.

The WSALTE also contains a dictionary feature. This dictionary solves the problem encountered when server access log formats are dynamic. The WSALTE is designed to support static access log formats. However, some web servers modify the access log format from one log file to the next. In addition, some servers permit the content of a single file to contain multiple log file formats. While these servers provide a comment describing the subsequent log file entries, the naming convention used from one web server to the next differs greatly. The dictionary feature provides a way to correlate any web server's naming convention with the WSALTE's naming convention. Once the dictionary feature can interpret the web server's comment, it can then create a description of the log format using the language and syntax supported by the WSALTE. Then the dictionary can override the WSALTE log format description with the new log format description used by the web server.

The dictionary feature is necessary because without this feature, processing server log files with dynamic formats is difficult or impossible. It is difficult because the web server administrator would either have to restrict modifications to the log file or would need to make constant adjustments to the log format description provided in the WSALTE's customizable ASCII file.

Processing log files with dynamic formats can be impossible if a single log file contained multiple formats, because any deviation from the format described in the customizable ASCII file would produce incorrect results. However, with the addition of the dictionary, the administrator may modify the format of the access log file(S) as often as desired without having to modify the ASCII file.

Figure 6:
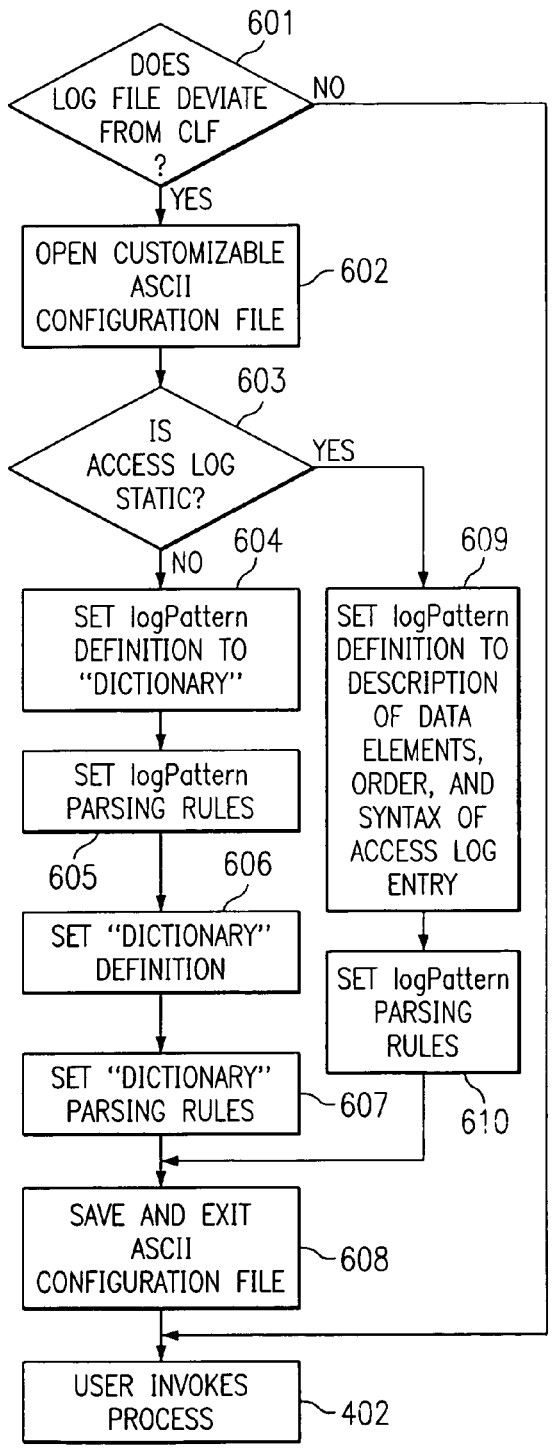
FIG. 6 depicts a flowchart illustrating the process of supplying a web server access log file description in accordance with the present invention.

Referring to FIG. 6, a flowchart illustrating the process of supplying a web server access log file description is depicted in accordance with the present invention. This process describes the details of step 401 in FIG. 4. The first step is to determine if the web server access log file deviates from CLF (step 601). If the file does not deviate from CLF, there is no need to make a format conversion, and the user may simply invoke the requested process (step 611).

If the requested log file does deviate from CLF, a customizable ASCII configuration file is opened and read (step 602) and the user determines if the web server access log is static or dynamic (step 603). If the access log file is static, the user sets the logPattern definition to the log entry's description of data elements, order, and syntax (step 609), and then sets the logPattern parsing rules (step 610). From there, the ASCII configuration file is saved and exited (step 608) and the user invokes the requested process (step 402).

If the access log file is dynamic, the process is more complicated and requires the use of the dictionary feature described above. The user sets the logPattern definition to "dictionary" (step 604) and then sets the logPattern parsing rules (step 605). The user then sets the "dictionary" definition (step 606), as well as the dictionary parsing rules (step 607). The ASCII configuration file is saved and exited (step 608). The user may now invoke the requested process (step 402).

Figure 7:
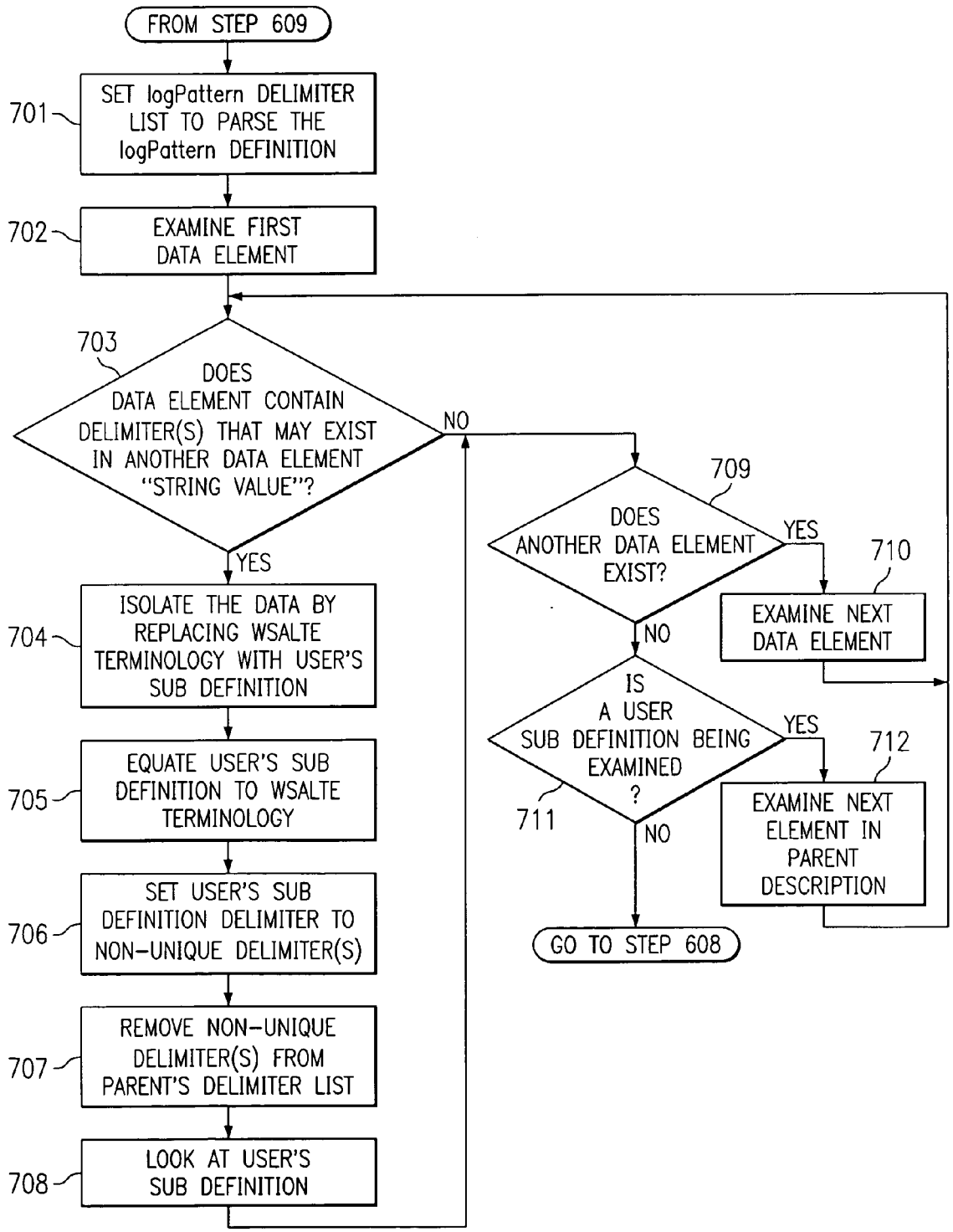
FIG. 7 depicts a flowchart illustrating the process of setting the logPattern definition for static log files in accordance with the present invention.

Referring now to FIG. 7, a flowchart illustrating the process of setting the logPattern definition for static log files is depicted in accordance with the present invention. The steps in FIG. 7 describe in detail the process corresponding to steps 609 and 610 in FIG. 6. After setting the logPattern definition in step 609, the user sets the logPattern delimiter list to parse the logPattern definition (step 701) and examines the first data element in the logPattern (step 702). Next it is determined if the data element could contain a delimiter (s) that may exist in another data element "string value" listed in the current definition (step 703).

If the data element does contain such delimiter(s), the data is isolated by replacing WSALTE terminology with the user's substitute definition (step 704). The user's substituted definition is then equated with WSALTE terminology (step 705). For example, the user might create a substitute definition that contains another substitute definition, so that there is a chaining of user substitute definitions. The following scenario dictates the need for chaining substitute definitions:

method="GET"
URL="my Car\index.html"
query="carModels"

which in an access file would look like:

"Get my Car\index.html?carModels"

There is a blank between the "Get" and the url data, and the url also contains a blank between "my" and "Car". In order to ensure the "method" is properly parsed using "blank" as a delimiter, while also ensuring that the url is not parsed with the blank, the data must be isolated. Isolating the data preserves the url information as "my Car\index.html", instead of being parsed as "my". In addition, if the url is parsed using the blank, subsequent data elements like "query" would contain incorrect data. For example, if "blank" was used to parse everything, the url would be set to "my" and query would be set to "Car\index.html", instead of "carModels".

The solution to the above problem is as follows:
myRequest_value=method myUrlQuery
myRequest_delim=blank
myUrlQuery_value=url?query
myUrlQuery_delim=?

The definition "myRequest_value" is not a known WSALTE key name and therefore must be a user substitute definition, but the term "method" is a WSALTE key name. Similarly, "myUrlQuery" is not a WSALTE key name, and therefore must be a substitute definition which resolves to two WSALTE key names: "url" and "query". The user substitute definition "myUrlQuery" is isolated so that the delimiter "blank" is not used on myUrlQuery. The myUrlQuery definition is then parsed using only "?" as a delimiter (rather than "blank"), thus keeping the data in "url" and "query" undisturbed.

After steps 704 and 705, the user's substitute definition delimiter list is then set to non-unique delimiter(s) (step 706) and the non-unique delimiter(s) is removed from the parent's delimiter list (step 707). For example, the user sets:

logPatern_value=host,user,day/month/year, hour:min:sec,method,url,query,status,bytes
logPattern_delim=[,/:]

The user looks at elements in the list and notices that "/" is used for day/month/year, but is also used as the path delimiter for url. The user removes day/month/year from the list and replaces it with the single word "date". The logPattern_value is now set to:

host,user,date,hour:min:sec,method,url,query,status,bytes

The user the removes the "/" from the delimiter list of the logPattern, so that logPattern_delim=[,:]. The user then creates:

date_value=day/month/year
date_delim=[/]

After steps 706 and 707, the user examines the substitute definition (step 708) and then determines if there are any more data elements (step 709).

If the data element does not contain a delimiter that may exist in another data element string values, the user must determine whether another data element exists in the log file (step 709). If another element does exits, the user examines the next data element in the file (step 710). If there is no other data element, the user determines if a user substitute definition is being examined (step 711). If a substitute definition is being examined, the user examines the next element in the parent description (step 712). If a substituted definition is not being examined, the user can return to step 608 in FIG. 6 and save and the ASCII configuration file.

Referring now to FIG. 8, a flowchart illustrating the process of setting the dictionary feature for dynamic access log files is depicted in accordance with the present invention.

The steps in FIG. 8 describe in detail the process corresponding to steps 606 and 607 in FIG. 6. After the logPattern parsing rules are set in step 605, the server access log comment field is examined with all CLF data elements represented (step 801). The first data element name in the field is examined (step 802) and it is determined whether or not the meaning of the name equates with a WSALTE name (step 803).

If the meaning of the data element name does equate with a WSALTE name, the server name is then equated with a WSALTE name in the "dictionary" list (step 806). The user then determines if another data element exists in the comment field (step 808). If there is another data element, the user examines the next element in the comment field (step 809) and returns to (step 803). If there are no other data elements in the comment field, a delimiter list is provided to parse the "dictionary" list (step 810), and the process continues to step 608 in FIG. 6.

If the meaning of the data element name does not equate with a WSALTE name, the user determines if the meaning of the name contains multiple WSALTE names (step 804). If the meaning does not contain multiple WSALTE name, the server name is equated with "ignore" (step 805). If the meaning does contain multiple WSALTE names, a substitute definition is provided using WSALTE names to describe discreet data elements (step 807). From there, the process continues to step 808 as described above.

Referring to FIG. 9, a flowchart illustrating the operation of the WSALTE is depicted in accordance with the present invention. This process describes the details of step 403 in FIG. 4. The WSALTE begins by reading the customizable ASCII file and creating configuration objects for key:value pairs (step 901). The WSALTE then sets the logPattern variable (step 902). The logPattern variable is described in greater detail in FIG. 10 below. The WSALTE opens the access log file (step 903) and reads a line in the file (step 904). The WSALTE determines if it has reached the end of the file (step 905). If the end has been reached, the WSALTE notifies the tool, application, adapter, etc., that there is no more data in the file (step 908) and then exits.

If the WSALTE has not reached the end of the file, it converts the data to CLF (step 906). The details of converting data to CLF are described in detail in FIG. 11 below. The WSALTE then sends the data in CLF to the tool, application, adapter, etc. (step 907). From there, the WSALTE returns to step 904 and reads the next line in the log file.

Figure 10:
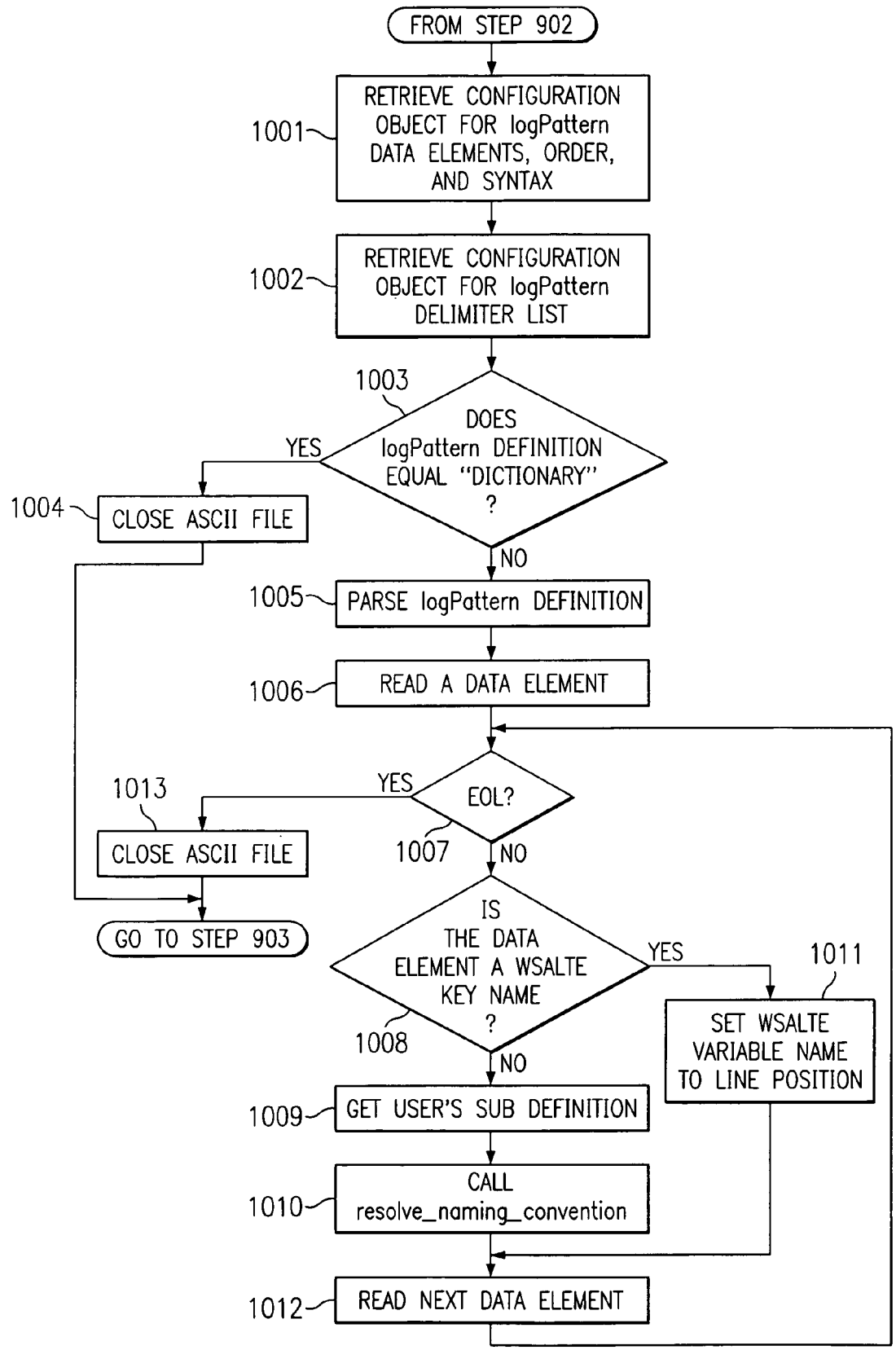
FIG. 10 depicts a flowchart illustrating the process of setting the logPattern variable in accordance with the present invention.

Turning now to FIG. 10, a flowchart illustrating the process of setting the logPattern variable is depicted in accordance with the present invention. The WSALTE retrieves the configuration object for logPattern data elements, order and syntax (step 1001). The configuration object for the logPattern delimiter list is then retrieved (step 1002). The WSALTE determines if the logPattern definition is equal to "dictionary" (step 1003). If the definition is equal to "dictionary", the ASCII file is closed (step 1004), and the WSALTE returns to step 903. If the logPattern definition is not equal to "dictionary", the WSALTE parses the definition (step 1005) and reads the first data element (step 1006).

The WSALTE determines if it is has come to the end of the line in the definition (step 1007). If it is at the end of the line, the WSALTE closes the ASCII file (step 1013) and returns to step 903.

If the WSALTE has not come to the end of the line in the logPattern definition, it determines if the data element is a WSALTE key name (step 1008). If it is a key name, the WSALTE variable is set to the name of the line position (step 1011). If the data element is not a WSALTE key name, the user's substituted definition is retrieved (step 1009) and the resolve_naming_convention protocol is called (step 1010). After step 1010 or 1011 is complete, the next data element is read (step 1012) and the WSALTE returns to step 1007.

Figure 11:
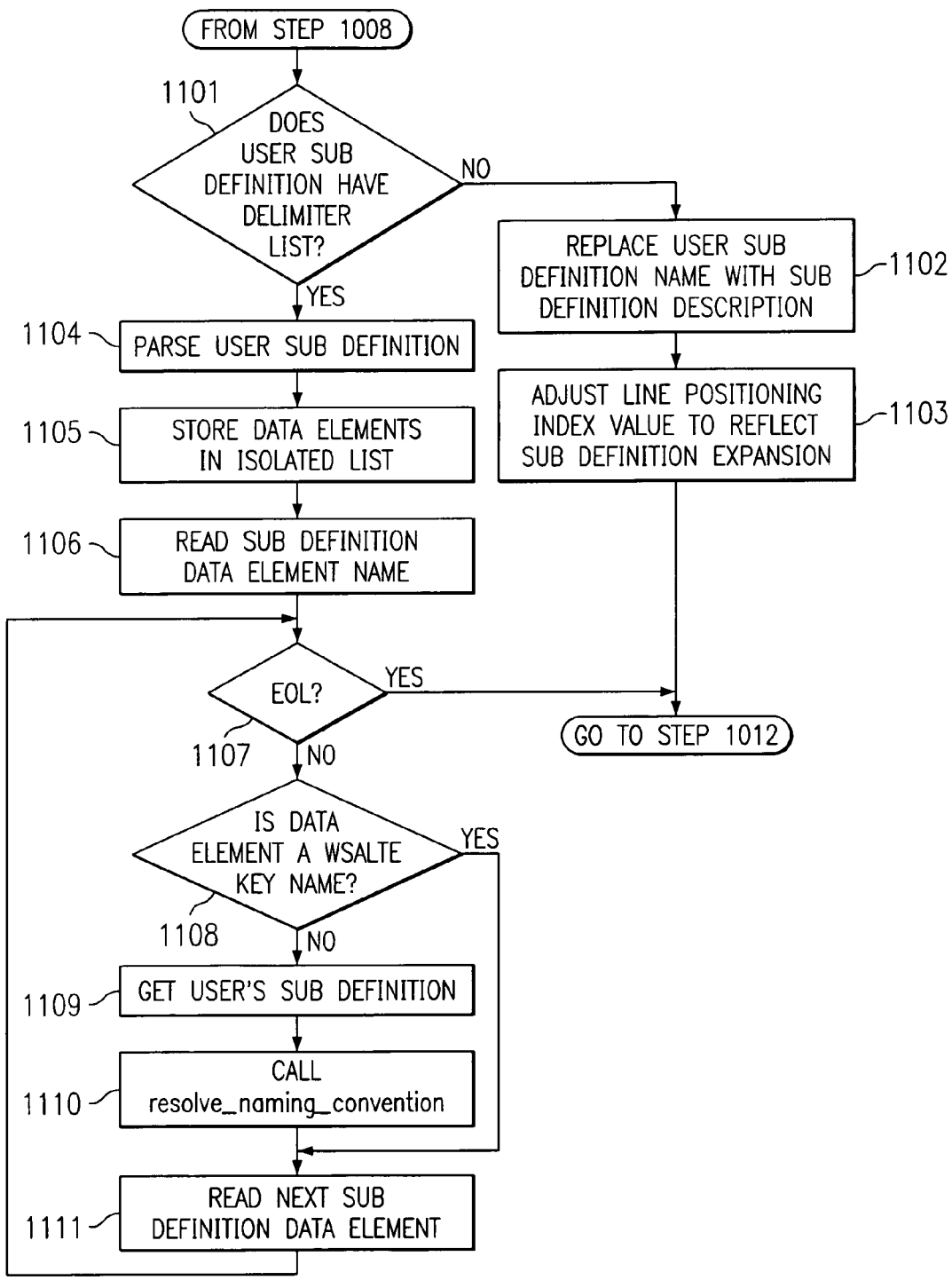
FIG. 11 depicts a flowchart illustrating the operation of calling the resolve_naming_convention protocol in accordance with the present invention.

Referring to FIG. 11, a flowchart illustrating the operation of calling the resolve_naming_convention protocol is depicted in accordance with the present invention. When the resolve_naming_convention protocol is called, the WSALTE first determines if the user substitute definition has a delimiter list (step 1101). If the substitute definition does not have a delimiter list, the WSALTE replaces the substitute definition name with a substitute definition description (step 1102) and adjusts the line positioning index value to reflect the substitute definition expansion (step 1103). The process then returns to step 1012 in FIG. 10.

If the substituted definition does have a delimiter list, the WSALTE parses the user substituted definition (step 1104) and stores the data elements in an isolated list (step 1105). The WSALTE will then read a data element name (step 1106) and determine is if it has come to the end of the line in the substitute definition (step 1107). If the WSALTE is at the end of the line of the definition, the process returns to step 1012. If the WSALTE is not at the end of the line of the definition, it determines if the data element is a WSALTE key name (step 1108). If it is a WSALTE key name, the WSALTE reads the next data element (step 1111) and returns to step 1107. If the data element is not a WSALTE key name, the WSALTE gets the user's substitute definition (step 1109) and calls the resolve_naming_convention protocol (step 1110) which correlates user substitute definitions with the WSALTE naming convention. The WSALTE then reads the next data element in the line (step 1111).

Figure 12:
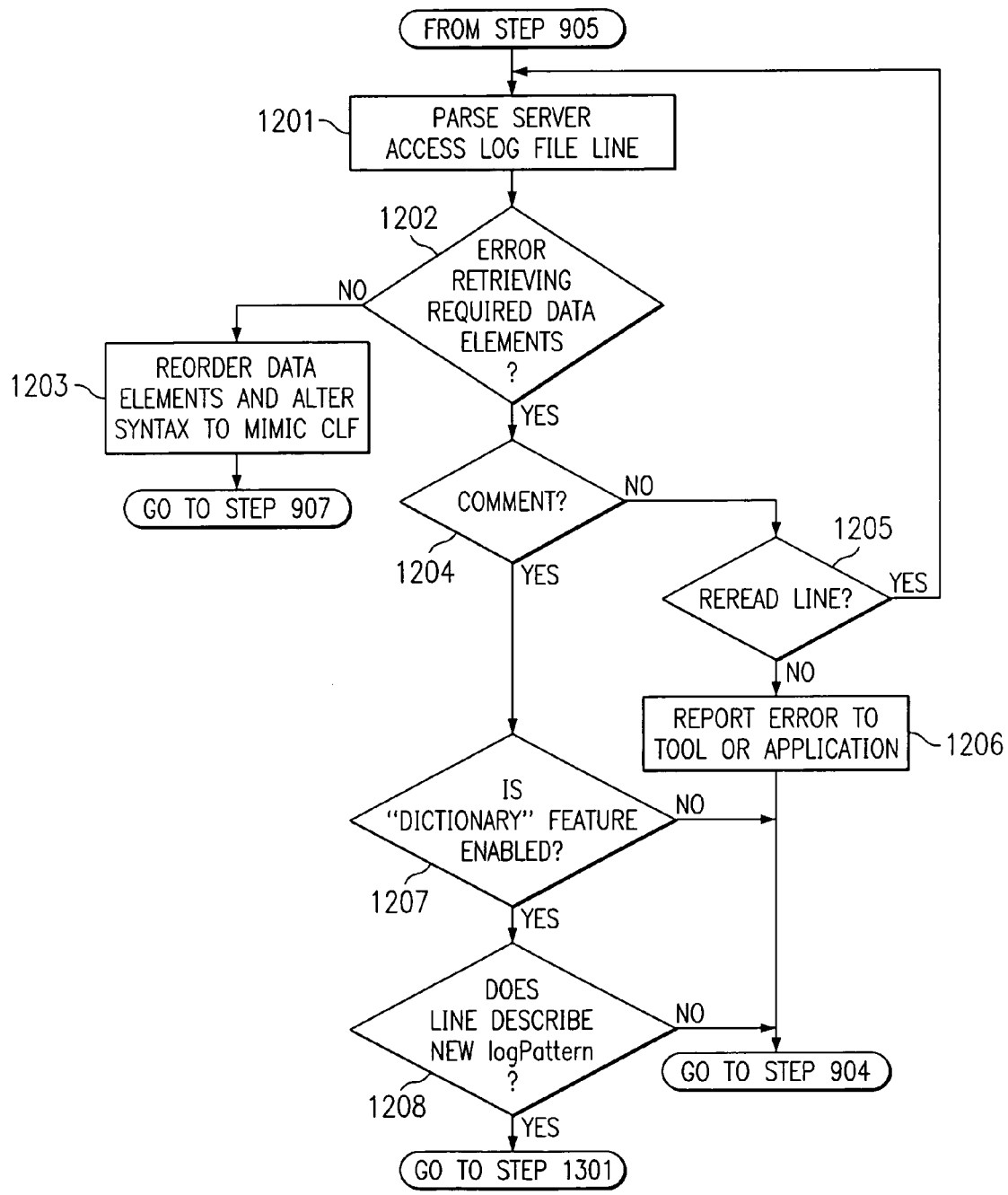
FIG. 12 depicted a flowchart illustrating the conversion of data to CLF in accordance with the present invention.

Referring to FIG. 12, a flowchart illustrating the conversion of data to CLF is depicted in accordance with the present invention. The steps in FIG. 12 describe the details of step 906 in FIG. 9. The WSALTE parses a line in the access log file (step 1201) and determines if there are any errors in retrieving required data elements (i.e. host, date, URL) (step 1202). If there are no errors in retrieving required data elements, the WSALTE reorders the data elements and alters the syntax to mimic CLF (step 1203), and then proceeds to step 907 in FIG. 9.

If there is an error in retrieving the data elements, the WSALTE checks if there in an entry in the web server comment field (step 1204). If there is no entry in the comment field, the WSALTE determines if it should reread the line in the log file (step 1205). Because the WSALTE is reading the data in real time, the data might not download completely before the WSALTE parses and reads the line. The WSALTE can be set to pause while data continues to download, and then go back and reread the line. A quota may be set for the number of times the WSALTE should attempt to reread the line. If the quota of rereads has not yet been reached, then the WSALTE should reread the line and return to step 1201.

If the specified reread quota has been reached, the WSALTE does not reread the line, but instead reports the error to the relevant tool, application, adapter, etc. (step 1206). The WSALTE then returns to step 904 and reads the next line in the access log file.

If the WSALTE determines in step 1204 that there is an entry in the web server comment field, it checks if the "dictionary" feature is enabled (step 1207). If the dictionary feature is not enabled, the WSALTE goes back to step 904.

If the dictionary feature is enabled, the WSALTE checks if the line in the web server comment field describes a new logPattern (step 1208). If the line does describe a new logPattern, the WSALTE proceeds to step 1301 in FIG. 13. If the line in the comment field does not describe a new logPattern, the WSALTE goes back to step 904.

Figure 13:
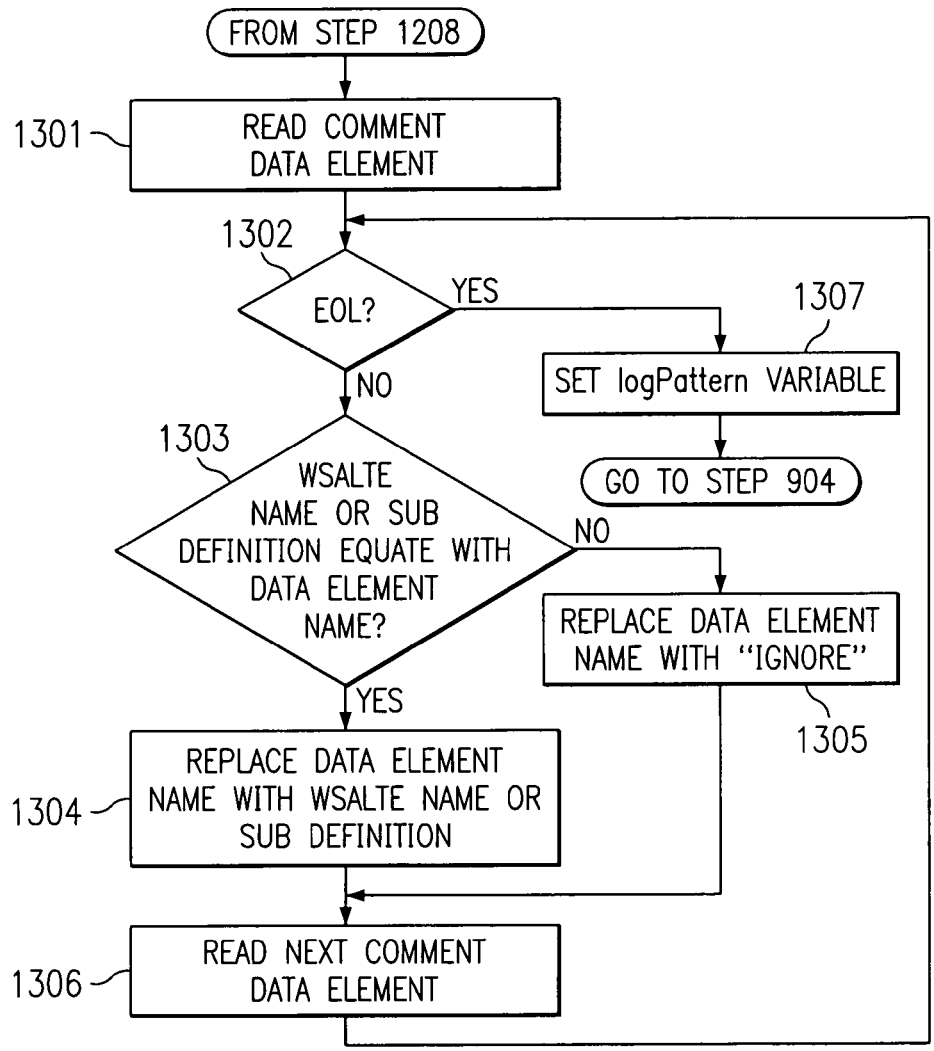
FIG. 13 depicts a flowchart illustrating the process of translating a comment into WSALTE terminology and setting the logPattern variable in accordance with the present invention.

Referring now to FIG. 13, a flowchart illustrating the process of translating a logPattern comment into WSALTE terminology and setting the logPattern variable is depicted in accordance with the present invention. This process flow originates from step 1207. The WSALTE reads the first comment data element (step 1301) and determines if it is at the end of the line (step 1302). If the WSALTE is at the end of the line, it sets the logPattern variable (step 1307) and proceeds to step 904 to read the next line in the log file.

If the WSALTE is not at the end of the line, it checks if the data element name equates with a WSALTE key name or user supplied substitute definition (step 1303). If the data element name does not equate to a WSALTE key name or user substitute definition, the WSALTE replaces the data element name with "ignore" (step 1305) and proceed to read the next comment data element (step 1306). If the data element name does equate with a WSALTE key name or user substitute definition, the WSALTE replaces the data element name with the corresponding WSALTE key name or user substitute definition (step 1304), and then proceeds to read the next comment data element (step 1306).

One advantage of the WSALTE is that the code to translate any web server's access log into CLF resides in one place, rather than having each adapter in the system add similar code. The WSALTE cuts down on both code maintenance and code size.

Another advantage of the WSALTE is that the number of supported web servers are increased. Popular web servers like Microsoft's IIS and Netscape's iplanet which may not adhere to CLF standards can now be added to the list of supported web servers for systems that rely on CLF. In fact, web servers that provide a minimum set or required data (host, date, time, url, and status) can be reordered to mimic CLF.

In addition, because the WSALTE uses a customizable ASCII file, the engine code will not need any modifications to address web server log formats unknown during the WSALTE's development, thus adding to the WSALTE's flexibility. Thus if an existing web server changes its log file entry content and/or order, or if new log formats are introduced, the WSALTE code will not need to change, but the data supplied in the ASCII file would change.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for establishing compatibility between heterogeneous web server access log formats, comprising:
   supplying a description of an access log file of a web server, by:
      opening a customizable configuration file;
      if the access log is static, setting a log pattern definition to describe data elements, order, and syntax of log entries;
      if the access log is dynamic, setting a dictionary feature for a log pattern definition;
      saving and exiting the configuration file; and
   invoking a computer process, wherein the process in turn invokes a web server access log translation engine (WSALTE) which translates the described web server access log file to a desired log format and returns the translated file back to the computer process.

2. The method according to claim 1, wherein the computer process comprises at least one of a tool, application, and adapter.

3. The method according to claim 1, wherein the step of setting the log pattern definition for a static access log further comprises:
   examining each of a plurality of data elements in an entry of the access log file;
   if a data element contains a delimiter that may exist in another data element, isolating the data by replacing the WSALTE terminology with a user substitute definition;
   equating the user substitute definition with WSALTE terminology;
   equating the user substitute definition delimiters with non-unique delimiters; and
   removing non-unique delimiters from a parent delimiter list.

4. The method according to claim 1, wherein the step of setting the dictionary feature for a dynamic access log further comprises:
   examining each of a plurality of data elements in an entry of the access log file;
   if the name of the data clement equates with a WSALTE name in the dictionary feature, equating the server name with a WSALTE name;
   if the name of the data element does not equate wit a WSALTE name, determining if the data element name contains multiple WSALTE names;
      if the data element name contains multiple WSALTE names, providing substitute definitions, using WSALTE names, which describe discreet data elements; and
      if the data clement name does not contain multiple WSALTE names, equating the server name with an ignore label.

5. The method according to claim 1, wherein the customizable configuration file is an ASCII file.

6. A method for translating heterogeneous web server access log formats, comprising:
   reading a customizable configuration file and creating configuration objects;
   setting a log pattern variable;
   opening a server access log file and reading a line within the file;
   translating data in the file line into a desired log format, by:
      parsing a server access log file line;
      if there is no error in retrieving required data, reordering data elements and syntax to mimic the desired log format;
      if there is an error in retrieving required data, checking if there in an entry in the web server comment field;
      if there is no entry in the comment field, rereading the file line;
      if there is an entry in the comment field, checking that a dictionary feature is enabled;
   sending the translated data to a computer process; and
   exiting when all lines in the access log file have been read.

7. The method according to claim 6, wherein the step of setting the log pattern variable further comprises:
   retrieving configuration objects for data elements, order, and syntax of the log pattern;
   retrieving configuration objects for a log pattern delimiter list;
   if the definition of the log pattern is static, parsing the log pattern definition and reading a data element;
      if the data element does not correspond to a web server log translation engine (WSALTE) name, calling a protocol which resolves naming convention;
      if the data element does correspond to a WSALTE name, setting a WSALTE variable to the name of the data element position; and
   closing the configuration file when all data elements in the log pattern definition have been read.

8. The method according to claim 6, wherein the step of checking that the dictionary feature is enabled further comprises:
   if the dictionary feature is not enabled, reading the next line in the access log file;
   if the dictionary feature is enabled, determining if the comment field entry describes a new log pattern;
      if the comment field entry does not describe a new log pattern, reading the next line in the access log file; and
      if the comment field entry does describe a new log pattern, translating the entry in the comment field to WSALTE terminology.

9. The method according to claim 8, wherein the step of translating the entry in the comment field to WSALTE terminology further comprises:
   reading a data element in the comment field;
   if a WSALTE name equates with the name of the data element, replacing the data clement name with the WSALTE name;
   if a WSALTE name does not equate with the name of the data element, replacing the data element name with an ignore label; and
   exiting after all data elements in the comment field have been read.

10. The method according to claim 6, wherein the customizable configuration file is an ASCII file.

11. A computer program product in a computer readable medium for use in a data processing system, for establishing compatibility between heterogeneous web server access log formats, comprising:
   instructions for receiving a description of an access log file of a web server, by:
      opening a customizable configuration file;
      if the access log is static, setting a log pattern definition to describe data elements, order, and syntax of log entries;

if the access log is dynamic, setting a dictionary feature for a log pattern definition;
saving and exiting the configuration file; and
instructions for invoking a computer process, wherein the process in turn invokes a web server access log translation engine (WSALTE) which translates the described web server access log file to a desired log format and returns the translated file back to the computer process.

12. A computer program product in a computer readable medium for use in a data processing system, for translating heterogeneous web server access log formats, the computer program product comprising:
    instructions for reading a customizable configuration file and creating configuration objects;
    instructions for setting a log pattern variable;
    instructions for opening a server access log file and reading a line within the file;
    instructions for translating data in the file line into a desired log format, by:
        parsing a server access log file line;
        if there is no error in retrieving required data, reordering data elements and syntax to mimic the desired log format;
        if there is an error in retrieving required data, checking if there in an entry in the web server comment field;
            if there is no entry in the comment field, rereading the file line;
            if there is an entry in the comment field, checking that a dictionary feature is enabled;
    instructions for sending the translated data to a computer process; and
    instructions for exiting when all lines in the access log file have been read.

13. The computer program product according to claim 12, wherein the instructions for setting the log pattern variable further comprises:
    instructions for retrieving configuration objects for data elements, order, and syntax of the log pattern;
    instructions for retrieving configuration objects for a log pattern delimiter list;
    if the definition of the log pattern is static, instructions for parsing the log pattern definition and reading a data element;
        if the data element does not correspond to a web server log translation engine (WSALTE) name, instructions for calling a protocol which resolves naming convention;
        if the data element does correspond to a WSALTE name, instructions for setting a WSALTE variable to the name of the data element position; and
    instructions for closing the configuration file when all data elements in the log pattern definition have been read.

14. The method according to claim 12, wherein the instructions for checking that the dictionary feature is enabled further comprises:
    if the dictionary feature is not enabled, instructions for reading the next line in the access log file;
    if the dictionary feature is enabled, instructions for determining if the comment field entry describes a new log pattern;
        if the comment field entry does not describe a new log pattern, instructions for reading the next line in the access log file; and
        if the comment field entry does describe a new log pattern, instructions for translating the entry in the comment field to WSALTE terminology.

15. The computer program product according to claim 14, wherein the instructions for translating the entry in the comment field to WSALTE terminology further comprises:
    instructions for reading a data element in the comment field;
    if a WSALTE name equates with the name of the data element, instructions for replacing the data element name with the WSALTE name;
    if a WSALTE name does not equate with the name of the data element, instructions for replacing the data element name with an ignore label; and
    instructions for exiting after all data elements in the comment field have been read.

16. The computer program product according to claim 12, wherein the customizable configuration file is an ASCII file.

17. A system for establishing compatibility between heterogeneous web server access log formats, comprising:
    a receiving component which receives a description of an access log file of a web server, by:
        opening a customizable configuration file;
        if the access log is static, setting a log pattern definition to describe data elements, order, and syntax of log entries;
        if the access log is dynamic, setting a dictionary feature for a log pattern definition;
        saving and exiting the configuration file; and
    an invoking component which invokes a computer process, wherein the process in turn invokes a web server access log translation engine (WSALTE) which translates the described web server access log file to a desired log format and returns the translated file back to the computer process.

18. A system for translating heterogeneous web server access log formats, comprising:
    a reading component which reads a customizable configuration file and creates configuration objects;
    a selection component which sets a log pattern variable;
    an opening component which opens a server access log file and reads a line within the file;
    a translating component which translates data in the file line into a desired log format, by:
        parsing a server access log file line;
        if there is no error in retrieving required data, reordering data elements and syntax to mimic the desired log format;
        if there is an error in retrieving required data, checking if there in an entry in the web server comment field;
            if there is no entry in the comment field, rereading the file line;
            if there is an entry in the comment field, checking that a dictionary feature is enabled;
    a communication component which sends the translated data to a computer process; and
    an exiting mechanism which exits when all lines in the access log file have been read.

* * * * *

UNITED STATES PATENT AND TRADEMARK OFFICE
CERTIFICATE OF CORRECTION

| | |
|---|---|
| PATENT NO. | : 7,062,551 B2 |
| APPLICATION NO. | : 09/864117 |
| DATED | : June 13, 2006 |
| INVENTOR(S) | : Sedlack |

It is certified that error appears in the above-identified patent and that said Letters Patent is hereby corrected as shown below:

<u>Title Page</u>
(57) Abstract, Line 6: after "sets the" delete "tog" and insert --log--.

Signed and Sealed this

Fourteenth Day of November, 2006

JON W. DUDAS
*Director of the United States Patent and Trademark Office*